United States Patent [19]
Alpers

[11] 3,918,060
[45] Nov. 4, 1975

[54] TERMINAL AIM POINT REFINEMENT CIRCUIT

[75] Inventor: Frederick C. Alpers, Riverside, Calif.

[73] Assignee: The United States of America as represented by the Secretary of the Navy, Washington, D.C.

[22] Filed: July 24, 1972

[21] Appl. No.: 274,550

[52] U.S. Cl.............. 343/7.3; 343/7 A; 343/16 M
[51] Int. Cl.² .................... G01S 9/14; G01S 9/22
[58] Field of Search ................ 343/7 A, 7.3, 16 M

[56] References Cited
UNITED STATES PATENTS

| | | | |
|---|---|---|---|
| 2,831,969 | 4/1958 | Jankowski | 343/16 M |
| 3,064,253 | 11/1962 | Kirkpatrick | 343/16 M |
| 3,166,745 | 1/1965 | Engledew et al. | 343/7 A X |
| 3,648,286 | 3/1972 | Schoneborn | 343/7.3 |
| 3,717,874 | 2/1973 | Barriere | 343/7.3 X |

*Primary Examiner*—Malcolm F. Hubler
*Attorney, Agent, or Firm*—R. S. Sciascia; G. J. Rubens; T. M. Phillips

[57] ABSTRACT

Circuit means for causing a missile that is guided by a range-gated microwave seeker to home in its terminal phase on a particular point on the target. Aim point refinement circuits are provided that will select a reflecting point near the center of the target along the range axis, select a reflecting point near the center of the target along the yaw axis by angle gating and; select a reflecting point at the leading edge, center, or trailing edge of the longest range-resolved segment of the overall target.

8 Claims, 7 Drawing Figures

TERMINAL AIM POINT REFINEMENT CIRCUIT

CROSS REFERENCE TO RELATED APPLICATIONS

Copending U.S. Patent application Ser. No. 210,263, filed Dec. 17, 1971 now U.S. Pat. No. 3,813,670, and Ser. No. 260,703, filed June 5, 1972.

BACKGROUND OF THE INVENTION

In the past, most range-gated microwave seekers have not provided adequate enough range resolution to separate plural echo signals that are reflected from a single target. With such seekers the returns from all portions of the target are combined into one signal, and range is measured to some arbitrary point on that signal (usually the electrical center or the leading edge) while angle is measured to the apparent center of energy of the overall return. This center of energy is heavily influenced by the relative echoing properties of the various parts of the target and also by their phase relationships, with the result that two or more parts of the target may produce echoes that tend to add to or cancel each other. The center of energy that is tracked may therefore be some empty spot that is designated by the combination of these arbitrary phase and amplitude relationships, and typically undergoes considerable angular scintillation as relative phases change due to both missile and target motion.

In recent years seekers have been designed to provide a high range resolution and therefore, when used against targets of considerable size such as ships or aircraft, yield overall target echo signals that are groups of individual return pulses from different parts of the target. Before the missile is launched, the weapon systems operator might view such a compound signal on an oscilloscope and lock the seeker range gate to a particular portion of the signal which he considered optimum from the standpoint of missile guidance accuracy or warhead lethality. This is frequently impractical due to either the need to launch the missile at a range beyond the maximum range at which the seeker can provide such a signal, or changes in the target aspect in relation to the missile which makes the missile see a different compound signal before reaching the target.

The target, by detection of the microwave signals impinging on it or by other means, will frequently become aware that it is under attack and may introduce countermeasures. These could take various forms, including that of a simple corner-reflector type decoy that is released in the hope of distracting the missile seeker. Such a decoy would produce a very strong signal that is approximately one range resolution element in width. As the decoy drifted clear of the target, a seeker with relatively poor range resolution would generally tend to track some center of energy between the decoy and the target, while a seeker with high range resolution might tend to track the much stronger decoy signal in preference to the target echo. In either case, if the release timing were correct and the decoy achieved adequate separation, the effect would be to misguide the missile and carry it out of lethal range of the target.

SUMMARY OF THE INVENTION

The present invention provides a means to enable a range-gated microwave seeker to refine its aim point during the terminal phase of flight by providing terminal guidance signals to guide the missile to a particular point on a selected target. Guidance signals for guiding the missile to a reflecting point near the center of the target along the range axis. Guidance signals for guiding the missile to a reflecting point near the center of the target along the yaw axis are generated by angle gating. Guidance signals for guiding the missile to a reflecting point associated with the principal portion of the target are generated by selecting the leading edge, center, or trailing edge of the longest range resolved segment of the overall target.

OBJECTS OF THE INVENTION

An object of the invention is the provision of a means to enable a range-gated microwave seeker to refine its aim point during the terminal phase of flight.

Another object of the invention is to provide for correcting the aim point of a missile during the terminal phase of flight by selecting a reflecting point near the center of the target along the yaw axis.

Another object of the invention is to provide for correcting the aim point of a missile during the terminal phase of flight by selecting a reflecting point at the leading edge, center, or trailing edge of the longest range-resolved segment of the overall target.

A further object of the invention is to provide a circuit for correcting the aim point of a missile during the terminal phase of flight by selecting a reflecting point near the center of the target along the range axis.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
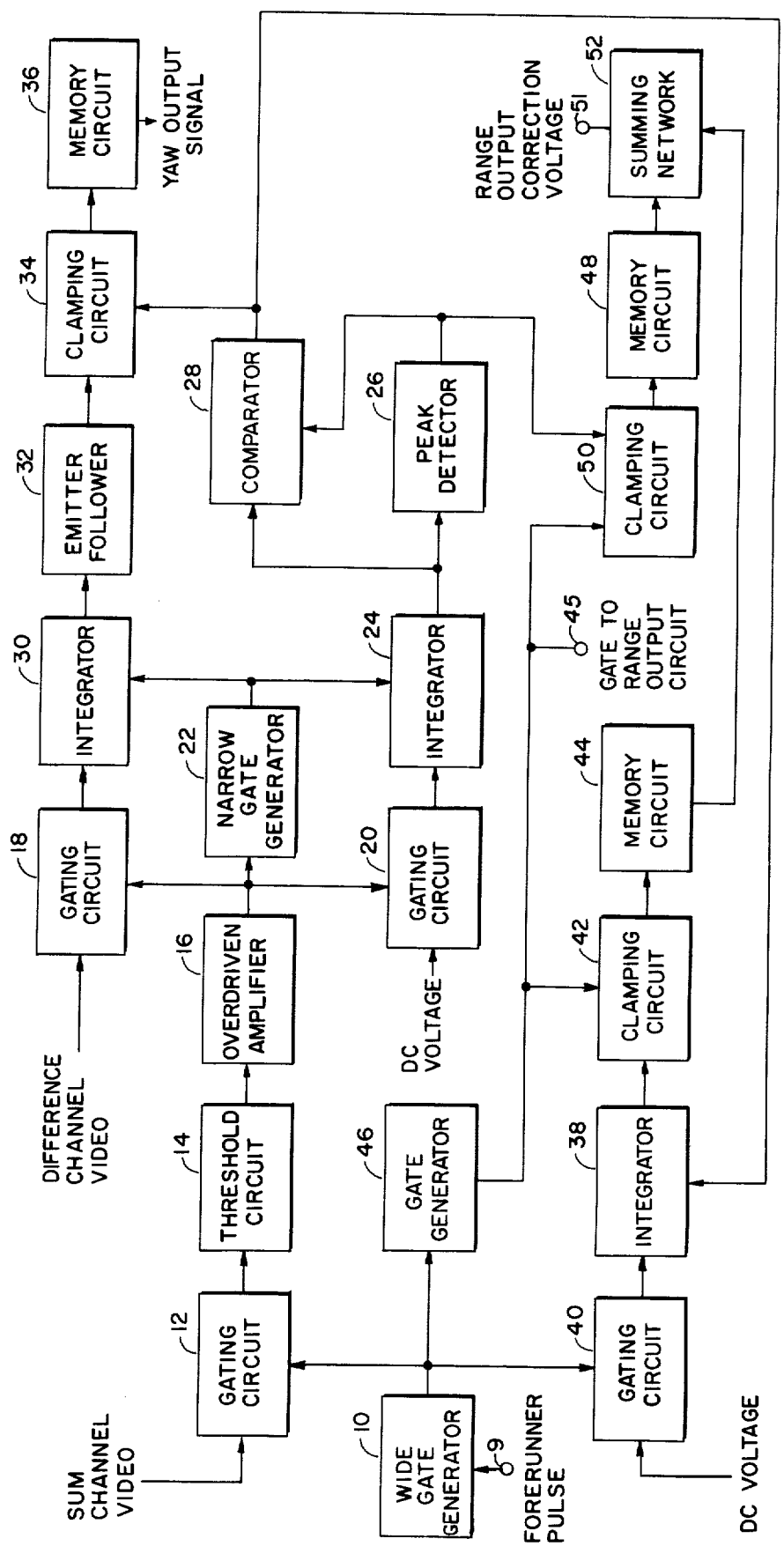
FIG. 1 is a block diagram of an embodiment of the invention based on integration of the longest segment of the target signal.
Figure 2:
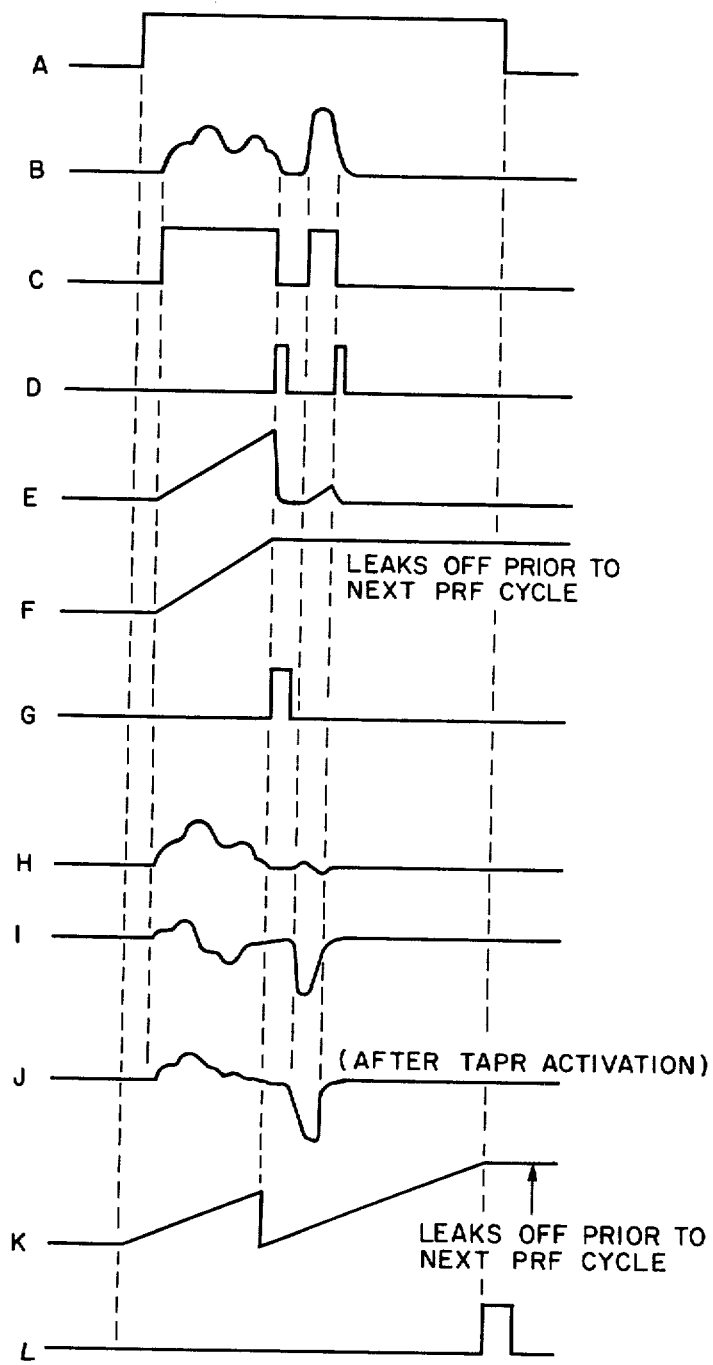
FIG. 2 is a graph of waveforms used in describing the embodiment of FIG. 1.

Referring now to the embodiment of FIG. 1 which is a block diagram of a terminal aim point refinement circuit based on integration of the main portion of the target signal in each (PRF) pulse repetition frequency cycle, circuit action begins with the forerunner pulse provided at terminal 9 by the range tracker shown and described in my copending U.S. Patent application, Ser. No. 210,263, filed Dec. 17, 1971. The pulse received at terminal 9 serves to trigger wide gate generator 10 to generate a pulse (waveform A, FIG. 2) wide enough to encompass the signals from all parts of small or medium size targets, including the wake of a ship, regardless of the viewing aspect, (a gate width of approximately 1 microsecond has been found satisfactory). Because of range tracker action and the relative timing of the forerunner pulse at terminal 9, gate circuit 10 is approximately centered on a strong signal from on or near the target, which signal the seeker has acquired and continues to track both before and after activation. The output pulse from gate 10 is fed to gating circuit 12, which may be of the biased diode type. The presence of the gating pulse gates circuit 12 to pass the sum channel video signal (waveform B) to threshold circuit 14. All portions of the compounds video signal that are of acceptable amplitude are passed to overdriven amplifier 16. Threshold circuit 14 and overdriven amplifier 16 will then produce a compound gate (waveform C) that is essentially at full amplitude whenever a significant portion of the compound video signal is present but is 0 when such is not the case. The compound gate out of amplifier 16 is fed to and turns on two additional gating circuits 18, 20 and is also fed to and triggers narrow gate generator 22 which generates a very narrow gating pulse (waveform D) each time a portion of the compound gate returns from full amplitude to zero. This causes gating circuit 20 to gate a dc voltage to integrator circuit 24 whenever a full amplitude portion of the compound gate is present. Integrator 24 may be a capacitor fed through a resistor which accumulates charge for as long as the compound gate is at full amplitude, but is is then quickly discharged by the narrow gate from gate generator 22, which occurs when the gate out of amplifier 16 returns to zero. With this arrangement, the output of integrator 24 is a voltage (waveform E) proportional to the continuous duration of that particular portion of the sum channel video signal which is then present. The output of integrator 24 reaches its peak amplitude in any given PRF cycle at the tail end of the longest continuous portion of the target signal that occurs within the wide gate.

With the broad action of integrator 24 to measure the duration of various individual portions of the target signal and related signals from the wake of decoys that might be present, a peak detector 26 and comparator 28 combination is used to select the longest continuous portion of the signal, which in nearly all cases will be that associated with the central portion and/or superstructure of the target itself. In this case peak detector 26 should be designed to detect and store the highest integrator output voltage (waveform F) during each PRF cycle (the voltage gradually leaks off so that the detector output returns to zero between cycles), and comparator 28 generates an output pulse (waveform G) each time integrator 24 completes a charging interval that results in an integrator output voltage higher than that previously stored within peak detector 26 during that PRF cycle. Thus comparator 28 may generate several output pulses in a given cycle, but the last pulse to occur during the cycle will be the pulse associated with the trailing edge of the longest individual portion of the target signal.

To obtain a yaw output signal that relates only to the longest individual portion of target signal, gating circuit 18 passes signals from the monopulse difference channel (waveform H) to integrator circuit 30 whenever there is an output gate from amplifier 16. As is generally the case with monopulse radars, video signals change polarity and vary in amplitude depending upon the position, with respect to the seeker antenna axis, of that particular portion of the target that they represent. Therefore integrator 30 should be designed to accept both polarities as well as various amplitudes of input, and will provide an output that represents the mean yaw position of the echo producing portions of the target that contribute to the segment of target signal being integrated. With the usual type of automatic gain control applied to the seeker difference channel receiver, the main voltage obtained by the integrator will give heavier weighing to the stronger element of signal within the particular segment being sampled; however, if an instantaneous gain control based on the instantaneous sum channel video signal is used, the averaging that leads to the mean value will give equal weighing to each resolvable range element within the continuous segment, regardless of relative signal strength. In either case, the integrated yaw signal (waveform J) will represent a yaw direction somewhere near the center of the reflecting surfaces that contribute to that particular portion of the target signal, but not necessarily a yaw direction aimed at any signal reflecting element. As was the case with integrator 24, integrator 30 is discharged (returned to zero voltage) by the narrow gate from gate generator 22 each time that a signal passed by overdriven amplifier 16 returns to zero. The output of integrator 30 which thereby results during a given PRF cycle is coupled by emitter follower 32 and clamping circuit 34 to the yaw memory circuit 36. Clamping circuit 34 should be of the type wherein a two way gating circuit with a very high leakage resistance serves to isolate the following memory circuit 36 from one PRF cycle to the next. When gated, clamping circuit 34 causes memory circuit 36 to store the voltage of the preceding emitter follower. In this instance clamping circuit 34 is activated by the output pulse from comparator 28, and therefore causes memory circuit 36 to retain the integrated yaw signal for each successive portion of the overall target signal that exceeds prior portions of the signal in terms of signal segment width. For early, relatively short portions of the target signal there may be clamping action that result in a yaw output signal, but such outputs are so quickly displaced (in < 1 microsecond) by the yaw signal of the longest duration that they have no measurable effect on subsequent seeker antenna positioning for missile yaw control. Thus the yaw signal which is retained in memory circuit 36 through a PRF cycle, and which therefore is the only signal of consequence, is the signal associated with the longest portion of the target signal and with the final clamping action for that PRF cycle.

A range voltage related specifically to the longest portion of the compound target signal is initiated by gating a dc voltage to integrator 38 through gating circuit 40 which is turned on by the wide gate from gate generator 10. Integrator 38 is discharged each time a pulse is produced by comparator circuit 28. The output voltage of integrator 38 (waveform K) attained at the termination of the wide gate is then fed through clamping circuit 42 to memory circuit 44 where it is retained until replaced by a similar signal in the next PRF cycle. Clamping circuit 42 is controlled by a gate generated by gate generator 46 when triggered by the trailing edge of the pulse from wide gate generator 10. The output signal from gate generator 46 is fed as an input to clamping circuit 50 and as a gate (waveform L) to the range output circuit at terminal 45. The result is that the regular seeker range output circuit produces a voltage precisely proportional to the time between the leading edge of the transmitter pulse (as it appears in the receiver output) and the trailing edge of the present wide gate circuit, while the above memory circuit 44 produces a clamped output voltage proportional to the time between the trailing edge of the longest portion of the longest signal and the trailing edge of the wide gate signal from wide gate generator 10.

By a similar technique memory circuit 48 is clamped with a voltage proportional to the output of peak detector 26 for that PRF cycle by means of clamping circuit 50 which is gated by the output gate from gate generator 46. The output voltage from memory circuit 48 represents the time difference between the leading and the trailing edge of the longest portion of the target signal. The output voltage from memory circuit 48 is fed to summing network 52 where it is added to the output voltage of memory circuit 44. Since the same proportionality constants are used in both cases, the resultant range output correction voltage at terminal 51 is therefore proportional to the time difference between the leading edge of the longest portion of the target signal and the trailing edge of the wide gate. The range output correction voltage can now be subtracted from the voltage concurrently developed within the regular seeker range output circuit and provide a corrected range output voltage to be used to establish the missile pitch trajectory voltage that is precisely portional to the time between the leading edge of the seeker transmitter pulse (after receiver induced delays) and the leading edge of the longest portion of the target return signal (also after the same delays).

Figure 3:
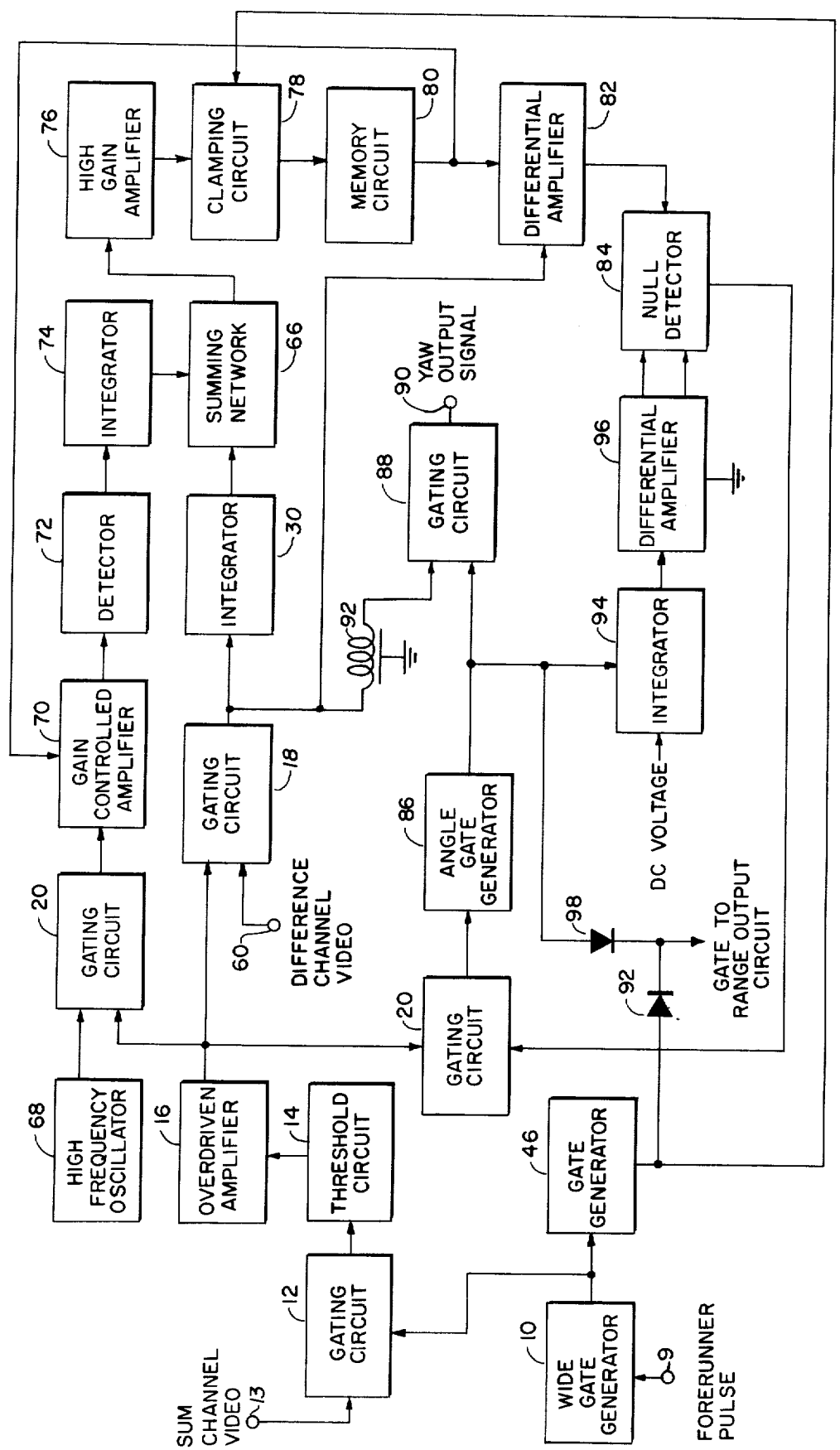
FIG. 3 is a block diagram of an embodiment of the invention based on angle gating.

FIG. 3 shows a terminal aim point refinement circuit which selects a reflecting portion of the target nearest to the mean yaw displacement axis (measured from the seeker antenna axis) of all the various target related elements. This circuit may be described as one which angle gates the various range-resolved segments of the target echo signal and the signals from wake or decoys, and selects for homing use only one particular segment of signal that lies near the mean angular bearing of all the segments involved. The compound gate signal out of overdriven amplifier 16 is fed to and gates gating circuit 18 to pass the difference channel video signal at terminal 60 to integrator 30. Integrator 64 accumulates a positive or negative charge depending on the individual polarities of the various difference signal segments throughout the duration of the wide gate interval from wide gate generator 10. The output signal from integrator 64 is fed as one input to summing network 66. Since the charge leaks off prior to each new PRF cycle the output of integrator 64 at the end of the wide gate interval may be mathematically represented as $$\int_o^{t_1} f(t)dt,$$

where $f(t)$ expresses the variation with time ($t$) of the difference signal as it is received during the aggregate interval $t_1$ when both the wide gate and a sum signal are actually present.

The other input to summing network 66 is generated by gating a high frequency oscillator 68 (having a frequency on the order of several hundred MHz) by the output gate from overdriven amplifier 16 through gating circuit 20. The result is a series of bursts of carrier signals timed to correspond with the sum channel video signals at terminal 13. These carrier signals are amplified in gain controlled amplifier 70 and then detected by detector 72 to produce a series of pulsed signals resembling the compound gate but with varying amplitude. The output pulses from detector 72 are integrated in integrator 74 and provide the second input voltage to summing network 66. Since the output of integrator 74, is also one in which the charge leaks off between PRF cycles its output voltage is proportional to $\alpha t_1$ where $\alpha$ represents the gain of gain controlled amplifier 70.

The output of summing network 66 which is mathematically represented as $$\alpha t_1 + \int_o^{t_1} f(t)dt,$$

is amplified in high gain amplifier 76 with gain $= \mu$ and coupled through clamping circuit 78 to memory circuit 80. Clamping circuit 78 is unclamped by the gate signal from gate generator 46 which is triggered by the trailing edge of the gate signal from wide gate generator 10, and therefore occurs at the end of the signal reception of interest.

The resulting memory voltage out of memory circuit 80 is fed back to amplifier 70 to establish the gain during the following PRF cycle. The output voltage of memory circuit 80 can be written as $$v = -\mu \left\{ \alpha t_1 + \int_o^{t_1} f(t)dt \right\} \qquad (1)$$

Because of the feedback, $\alpha = k' v$, where $k'$ is a proportionality constant. Equation (1) then becomes $$v = -(\mu k' t_1)v - \mu \int_o^{t_1} f(t)dt \qquad (2)$$

which reduces to $$v = \left\{ \frac{-\mu \int_o^{t_1} f(t)dt}{1 + \mu k' t_1} \right\} \qquad (3)$$

but since $\mu \gg 1$, equation (3) further reduces to $$v = \frac{1}{k'} \left[ \frac{\int_o^{t_1} f(t)dt}{t_1} \right] \qquad (4)$$

Since the term in the brackets in equation (4) is the familiar expression for a mean value, equation (4) shows that the output voltage of memory circuit 80 is essentially proportional to the mean yaw signal for all the range-resolved signal elements within the wide gate interval.

In order to compare the yaw signal for any range-resolved element of the target complex with the mean yaw signal for the whole complex, the gated difference channel video signal, $f(t)$, and the memory circuit 80 output voltage $V$, are connected to opposite sides of differential amplifier 82. The output of differential amplifier 82 will therefore go to zero if and when the two inputs become equal, indicating that the signal segment present at that instant comes from a reflecting object that lies in the mean angular direction of all returns within the wide gate. Such a zero value in differential amplifier 82 output is detected by null detector 84 which then supplies a signal output whenever, or as long as, this condition exists. To avoid use of the meaningless null detection in the special case when $V = 0$ and no instantaneous yaw signal is present, the output of null detector 84 is channelled through gating circuit 20 where it is allowed to pass only when a compound gate (indicative of an above threshold sum channel signal) is present. A null signal which meets this criterion then triggers angle gate generator 86, which, in turn, activates a gating circuit 88 that passes that particular null producing segment of yaw signal onto the seeker directional output circuits for yaw control purposes at terminal 90. A short delay line is inserted ahead of gating circuit 88 to compensate for delays in the null detector and related circuitry. Angle gate generator 86 should be designed with time constants that permit it to trigger only once during each PRF cycle and thus only the first yaw signal to meet the angular requirements during a given cycle will be passed on for control purposes. the output In instances where there will be no single element of yaw signal which precisely equals the mean value of that signal and exists for a sufficient number of nanoseconds for null circuit 84 to sense the equality and trigger gate 20, an additional integrator 94 and differential amplifier 96 are provided to widen the tolerances of null detector 84 until a signal is found that meets the relaxed null requirements. Integrator 94 should have a long time constant, and when the aim point refinement circuit is activated, it commenses to integrate a dc voltage which is independent of the change in PRF cycles. Thus integrator 94 presents a voltage that increases steadily from cycle to cycle. When a null signal appears, however, the resultant angle gate out of angle gate generator 86 is used to subtract at least one PRF cycle worth of charge from integrator 94 so that theoutput of integrator 94 does not increase further. The output is fed to one side of differential amplifier 96 and the other side of differential amplifier 96 is grounded. This causes amplifier 96 outputs which increase in positive and negative directions, respectively, as the output voltage from integrator 94 increases, and these outputs change the null detector upper and lower limits to give the wider detection tolerances desired. The overall result is that the circuit attempts to select for guidance purposes the portion of the target signal that comes from the mean angular direction of all the target related signals. If several such signals are present, it selects the one nearest in range. If no signals which exactly meet this criterion are present, the circuit widens its tolerances to progressively include possible signals from objects both to the left and right of the mean position until a suitable signal nearest to the mean is selected. With the arrangement of diodes 92 and 98 to provide angle gate pulses to the seeker range output circuit when there is no signal present at the output of angle gate generator 86, the clamping gate out of gate generator 46 is temporarily substituted for any missing angle gate.

Figure 4A:
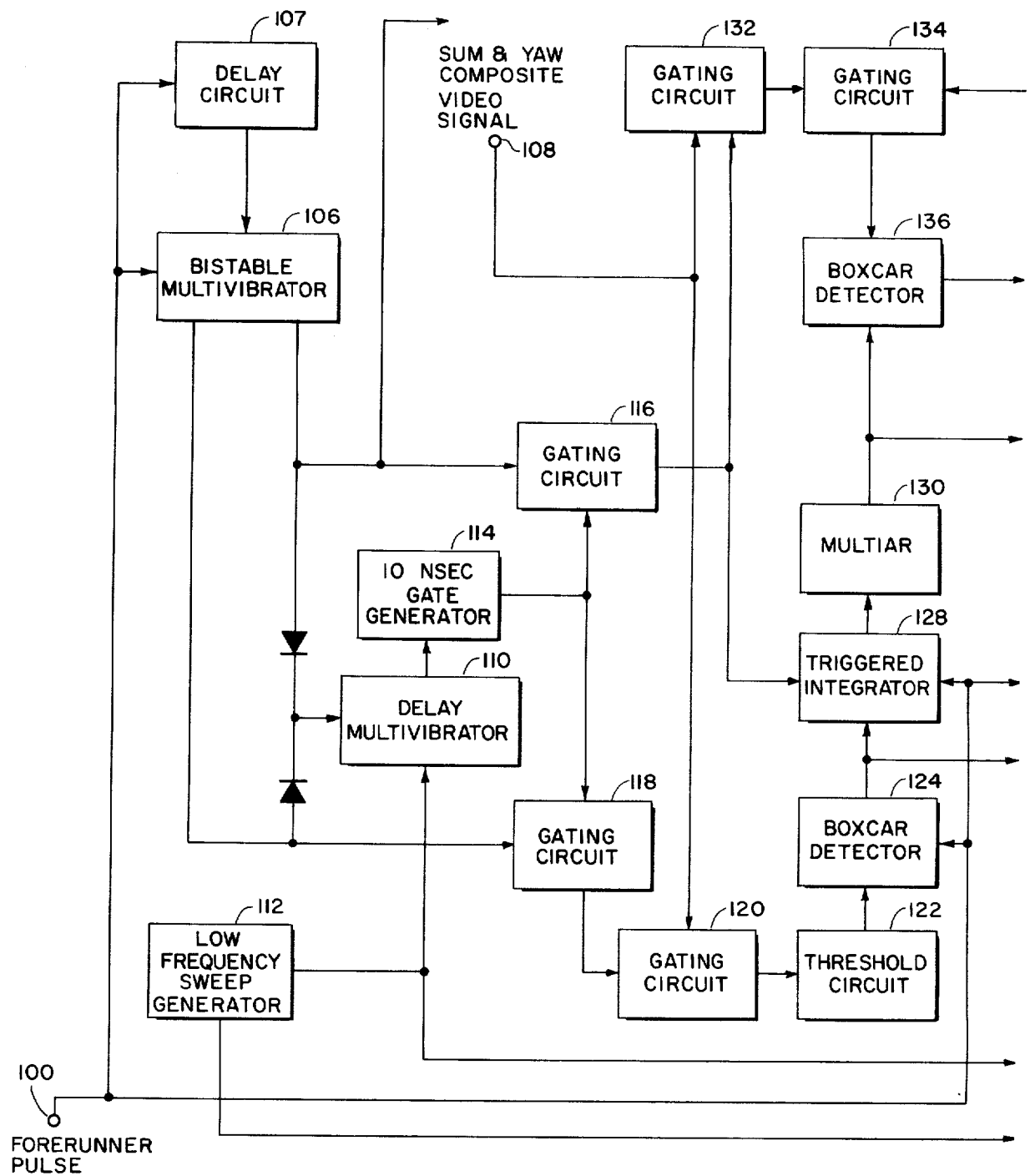
FIGS. 4A and 4B are block diagrams of a modification of the embodiment of FIG. 1 in which the monopulse reference and directional signals appear in one channel.

For reasons of economy and avoidance of certain channel matching requirements, some range gated microwave seekers process their sum signals and yaw signals through the same receiver channel in sequence, with the yaw signal following the sum signal by a prescribed delay, which is typically 200 nsec or more. The directional information is then conveyed by the ratio of the amplitudes of the sum and yaw signals. The composite video signal that results does not meet the input requirements of the circuits discussed above. Instead FIGS. 4A and 4B show a circuit that is compatible with a single composite video signal. This circuit functions by gating a given set of corresponding signal elements with a pair of precisely spaced gates, stretching the gated elements in boxcar detectors, dividing the yaw signal by the sum signal after both are stretched and original time differences are no longer of consequence, and sweeping the pair of gates jointly in range so as to allow the sequence to be repeated for consecutive signal elements within the limited target-related range interval during later PRF cycles.

The forerunner pulse from terminal 100 initiates gate generating at the beginning of each PRF cycle by turning on bistable multivibrator 106. The forerunner pulse is fed through a delay circuit 107 as a second input to multivibrator 106 to return it to its initial state for the next PRF cycle. The delay introduced by delay circuit 107 should be made equal to the delay between the corresponding sum signal and yaw signal elements in the composite video, which by way of example, is assumed to be 200 nsec, while the seeker range resolution is assumed to be 5 feet (equivalent to 10 $\mu$ sec). The width of the positive waveform from one side of multivibrator 106 is therefore 200 nsec, which is equal to the delay between corresponding sum channel and yaw channel elements in the composite video signal at terminal 108, and the width of the positive waveform from the other side is one PRF cycle minus 200 nsec.

The leading edge of each of these positive waveforms is used to trigger delay multivibrator 110, which means that it will be triggered twice per PRF cycle and the interval between triggers is 200 nsec. The delay generated by the delay multivibrator 110 in response to both triggering actions is the same and is controlled by a sawtooth voltage from low frequency sweep generator 112. Sweep generator 112 and delay multivibrator 110 should be designed to cause the delay to increase from approximately 20 to approximately 180 nsec during the time frame of 50 PRF cycles, and to repeat the sequence for subsequent groups of PRF cycles. The trailing edge of the delay multivibrator 110 waveform is then used as the trigger for 10 nanosecond gate generator 114. The circuitry to this point therefore pproduces two 10 nanosecond gates in each PRF cycle with the gates always 200 - nsec apart but with the pair increasing in delay with respect to the forerunner pulse as the sawtooth voltage increases from cycle to cycle. These gates are now applied as signal inputs to two gating circuits 116, 118 for which the gating action is controlled by the two position waveforms from bistable multivibrator 106. The first 10 nanosecond gate that occurs (that which follows the forerunner pulse by 20 to 180 nsec) is selected for application to sum channel circuits, to be described below, while the second gate (that with an additional delay of 200 nsec) is applied to the yaw channel circuits. The first 10 nanosecond gate is used to gate segments of the composite video signal that occur at increasing range on successive PRF cycles. These gated segments are gated through gating circuit 120 and processed through threshold circuit 122 to boxcar detector 124 (previously discharged by the forerunner pulse) where the aforementioned stretching of the sum channel signal takes place. The stretched output signals are fed to both an overdriven amplifier 126 (FIG. 4B) and a triggered integrator 128. Triggered integrator 128 should be of the capacitor circuit type that accumulates charge in proportion to the amplitude of the boxcar detector 124 output signal, but is held clamped at zero voltage and hence does not begin its charging phase until triggered by a separate triggering pulse. The separate triggering pulse for integrator 128 is supplied in the form of the second 10 nanosecond gate from gating circuit 116. After the charging phase, triggered integrator 128 is discharged by the next forerunner pulse, and thus a sawtooth output voltage results. The sawtooth voltage from integrator 128 is then fed to multiar circuit 130 where its amplitude is continuously compared to a fixed reference voltage. When the output of integrator 128 becomes equal to the reference voltage, multiar 130 generates an output pulse. This arrangement results in a pulse that occurs sooner in time as the amplitude of boxcar detector 124 signal increases; i.e., the time between the second 10 nanosecond gate and the multiar pulse is directly proportional to the inverse of the gated sum signal segment amplitude.

While the foregoing takes place in the sum channel the second ten nanosecond gate activates gating circuit 132 where a segment of yaw signal is selected which directly corresponds to the selected segment of sum signal for that particular PRF cycle. The gated yaw signal is than passed through a second gating circuit 134 that is controlled by the output of overdriven amplifier 126. As in the case of the circuit of FIG. 1 the gating by the output signal from overdriven amplifier 126 precludes passage of the yaw signal when the corresponding sum signal is not above a reasonable processing threshold. The output from gate circuit 134 is fed to boxcar detector 136 where yaw signal stretching takes place. In this case the discharge of boxcar detector 136 is effected by the output pulse from multier 130. The output of boxcar detector 136 therefore has an amplitude that is proportional to the yaw signal, but a duration that extends from the second 10 nanosecond gate to the occurrence of the multier pulse and is inversely proportional to the sum signal. The output from boxcar detector 136 is integrated in integrator 138. Assuming that other inputs to integrator 138 can be ignored, the result during each PRF cycle will be an accumulation of charge directly proportional to the yaw signal amplitude divided by the corresponding sum signal amplitude, which ratio represents the desired quantitative measure of the angular position of the source of that particular segment of signal with respect to the seeker antenna axis. If the source lies directly on the seeker axis and the above ratio is therefore unity, the total charge passed to the integrator from boxcar detector 136 in each PRF cycle will be a particular amount that is indicative of the unity ration. More charge will indicate a target off axis in one direction, e.g., to the right, and less charge will indicate in the opposite direction. Furthermore the amount of the charge at this point will be dependent only upon the angle of the source and not on its reflecting or single amplifying properties.

To avoid adverse effects of the on-axis amount of charge in later circuits and to provide, instead, the customary type of yaw voltage that returns to zero when the target is on axis, an offsetting charge of equal amount but opposite plarity to the on-axis charge is also supplied to the above integrator circuit each PRF cycle. This negative charge is supplied from bistable multivibrator 106 via bias diode 140. Diode 140 does not interfere with the previously described integrator action, since it comes during the sum channel portion of the multivibrator cycle when there can be no output from the yaw channel boxcar detector 136. The overall integrator action is therefore one of discharging to zero at the time of the forerunner pulse, accumulating a set amount of negative charge in the 200 nanosecond following the forerunner pulse, and accummulating a positive charge from that time until the time of occurrence of the multiar pulse, at which time all inputs cease for that particular PRF cycle. The resultant integrator 138 output voltage at the time of the multiar pulse is then detected by gated detector 142 (which is equivalent to a clamping and memory circuit, except long term memory is not needed). Detector 142 output will be zero when the sampled segment of video signal comes from a source on the seeker axis, and when the source is off axis it will be a positive or negative voltage indicative of both the direction and magnitude of the angular displacement from the axis.

The yaw signal integration is performed by integrator 144 which functions over a number of PRF cycles as signal elements from succeeding ranges or samples are received. In lieu of the pulse from a narrow gate generator as used in FIG. 1, the multi-cycle yaw channel integrator 144 is discharged by a signal supplied by terminal gate generator 146. Gate generator 146 is triggered by charge accumulating for a number of (e.g., three) successive PRF cycles on staircase integrator 148 which has the forerunner pulse as its input. However, integrator 148 is discharged by the signal from overdriven amplifier 126 whenever such a sum channel signal is present. Thus the operation of staircase integrator 148 is to accumulate charge during each cycle when a suitable sum signal is absent and to trigger the terminal gate generator 146 after a number of such cycles appear consecutively. As in the case of the narrow gate generator (FIG. 1), the resulting circuit action allows the multi-cycle integrator 144 to integrate the yaw directional information for the entire range span of a continuous segment of target signal, but discharges it after several cycles when the range sweep carries the gates beyond the termination of the particular segment. The requirement for signals to be absent for several cycles to initiate discharge is in consonance with the low frequency sweep rate of sweep generator 112. The sweep rate of generator 112 should be made slower than one range resolution element (10 nanoseconds) per PRF cycle in order to allow integration of a given element of return over several consecutive cycles and thereby reduce scintillation effects.

A second staircase integrator 150 provides a function which is the direct opposite of that described above, i.e., it builds up a voltage, a step at a time for each PRF cycle when a suitable sum signal is present, but discharges after several consecutive cycles of signal absence. To function in this manner integrator 150 utilizes the output signal from overdriven amplifier 126 as its input and the output gate from terminal gate generator 146 for discharge purposes. The output of staircase integrator 150 is fed to peak detector 152 and comparator circuit 154. The output signal of comparator 154 occurs at the conclusion of each segment of signal that is longer than any proceding segment of signal for a given low frequency range sweep. The output of comparator 154 is used to unclamp clamping circuit 156 and thereby causes the output of yaw integrator 144 at that instant to be stored in memory circuit 158. When the low frequency range sweep is completed, the recycling pulse from low frequency sweep generator 112 is used to unclamp a second clamping circuit 160 in the yaw channel, and the stored voltage in memory circuit 158 is fed to a second yaw memory circuit 161 where it serves as the yaw output signal at terminal 162 during the entire subsequent range sweep cycle. The overall result is that the output signal at terminal 162 is a measure of the integral of the seeker quantitative yaw data over the longest single segment of target-related signal during the preceding range sweep. To obtain a range voltage applicable to the point on the target selected by the above circuits, a range correction voltage must be derived and added to the range voltage otherwise supplied by the seeker. To this end, instantaneous values of sawtooth voltage from sweep generator 112 are successively stored in range memory circuit 164 by comparator-controlled clamping circuit 166 actions that occur simultaneously with the corresponding action in the yaw channel. The output voltage from peak detector 152 is then subtracted from the signal from memory circuit 164 in summing network 168. At the end of the range sweep, clamping circuit 170 is unclamped and the sum voltage relating to the longest portion of target signal is transferred to memory circuit 172, where it becomes the range output correction voltage at terminal 174 for the next range sweep cycle. Adding this correction voltage to the voltage from the regular range output circuit then gives the desired trajectory control voltage which represents the range from the seeker to the leading edge of the longest portion of the target.

Figure 4:
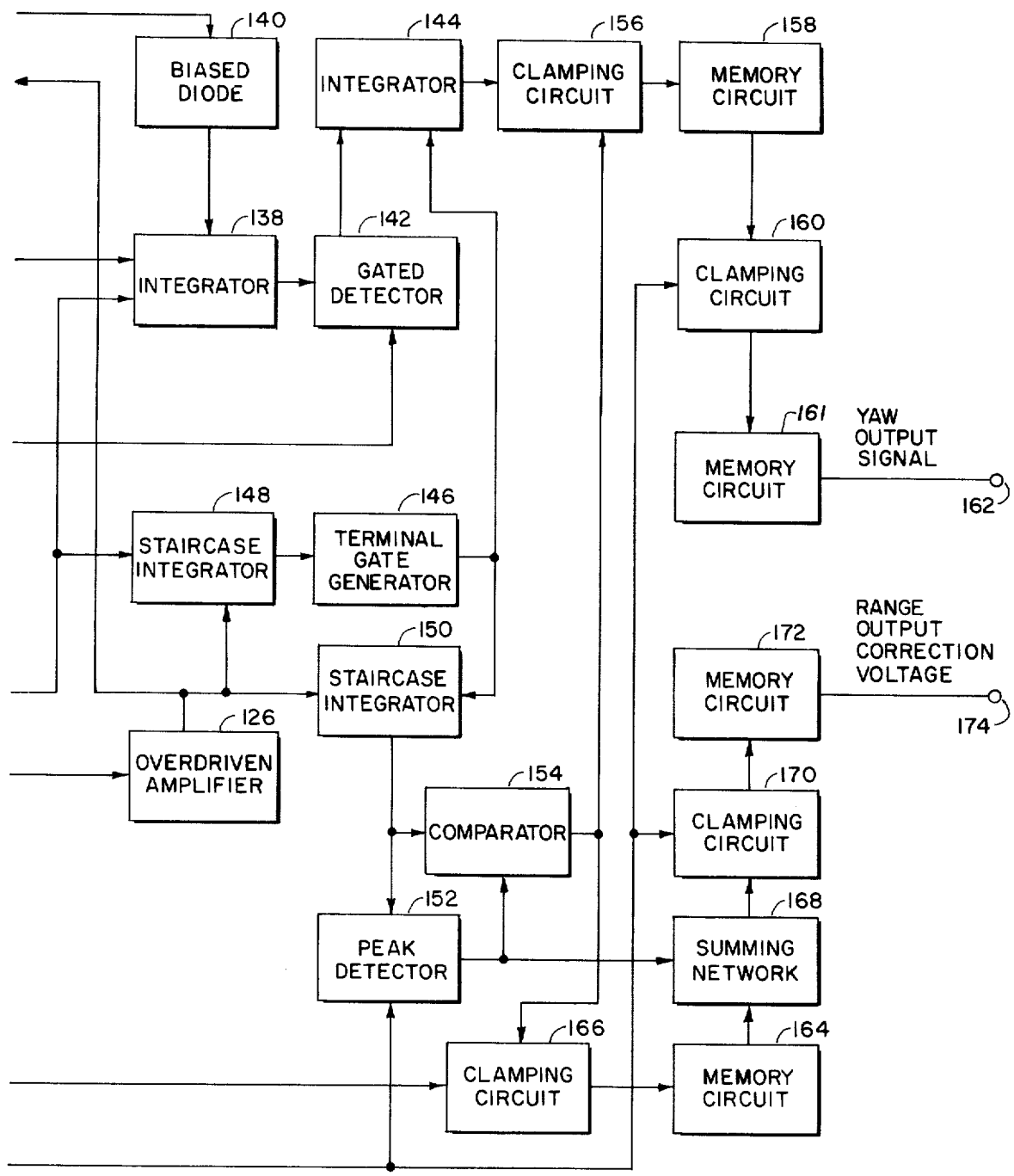
Figure 5:
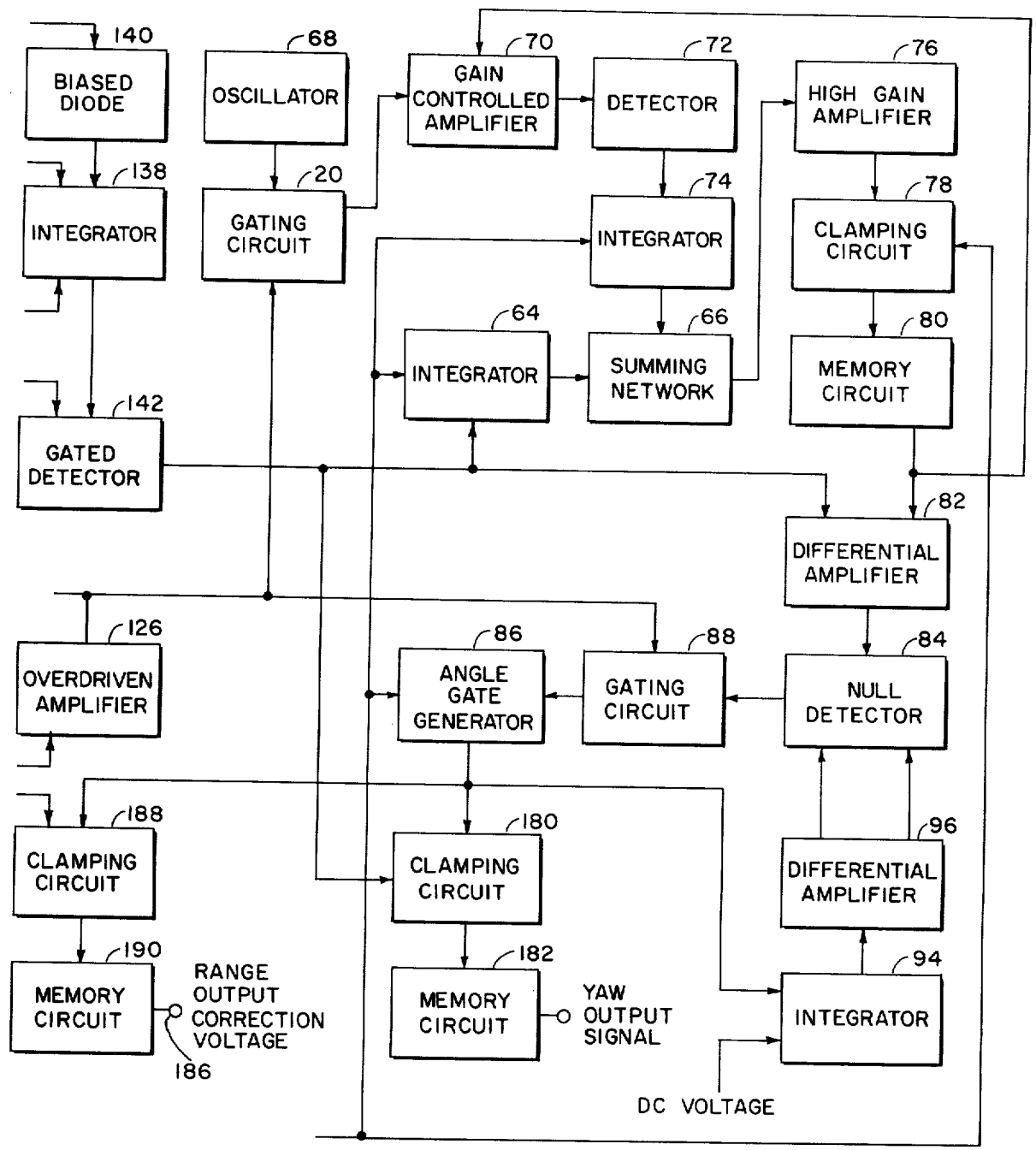
FIG. 5 is a block diagram of a modification of the embodiment of FIG. 3 in which the monopulse reference and directional signals appear in one channel.

An alternate circuit for use with a composite video type of seeker is shown in FIG. 5. This circuit combines a sum and yaw signal gating technique of the circuit shown in FIG. 4 with the angle gating technique of the circuit shown in FIG. 3. Most of the circuit blocks that appear in FIG. 5 represent circuits whose functioning has already been described in connection with FIGS. 3 and 4. The various components shown in the circuit of FIG. 5 perform their integrating, amplifying, clamping and other functions over a number of PRF cycles with stretched signals obtained by sampling one range element in each cycle, whereas the components in the circuit of FIG. 3 perform all functions within a given PRF cycle and the cycle following. Integrator circuits 64 and 74 which are used in deriving the mean yaw signal must be of a type that is discharged at the end of the low frequency range sweep rather than a type whose output leaks back to zero between cycles as in FIG. 3. To accomplish this the output from low frequency sweep generator 112 (FIG. 4A) is applied to each of integrators 64 and 74.

The circuits which provide the yaw output and the range correction voltage are similar to the clamping and memory circuits used for these purposes in FIG. 4 except that the functioning of these circuits is controlled by the output from angle gate generator 86. An angle gate signal is generated by angle gate generator 86 when a particular element of video signal is sampled that comes from a source located at or near the mean angular bearing of all the target related signal sampled and the gate is not repeated until the following low frequency range sweep. Hence the yaw signal that is clamped in clamping circuit 180 and stored in output memory circuit 182 for each range sweep in one which applies to a source nearest to the mean angular position of the range resolve target complex. Similarly the range output correction voltage at output terminal 186 which is clamped in clamping circuit 188 and stored in output memory circuit 190 is proportional to the time between the forerunner pulse at terminal 100 and the reception of that element of signal nearest the mean angular bearing. If the forerunner pulse is supplied as an input to the main seeker range output circuit, the regular range output voltage plus the correction voltage provided by the circuit of FIG. 5 will then yield a voltage precisely proportional to the range from seeker to the particular angle gated source within the target complex.

Figure 6:
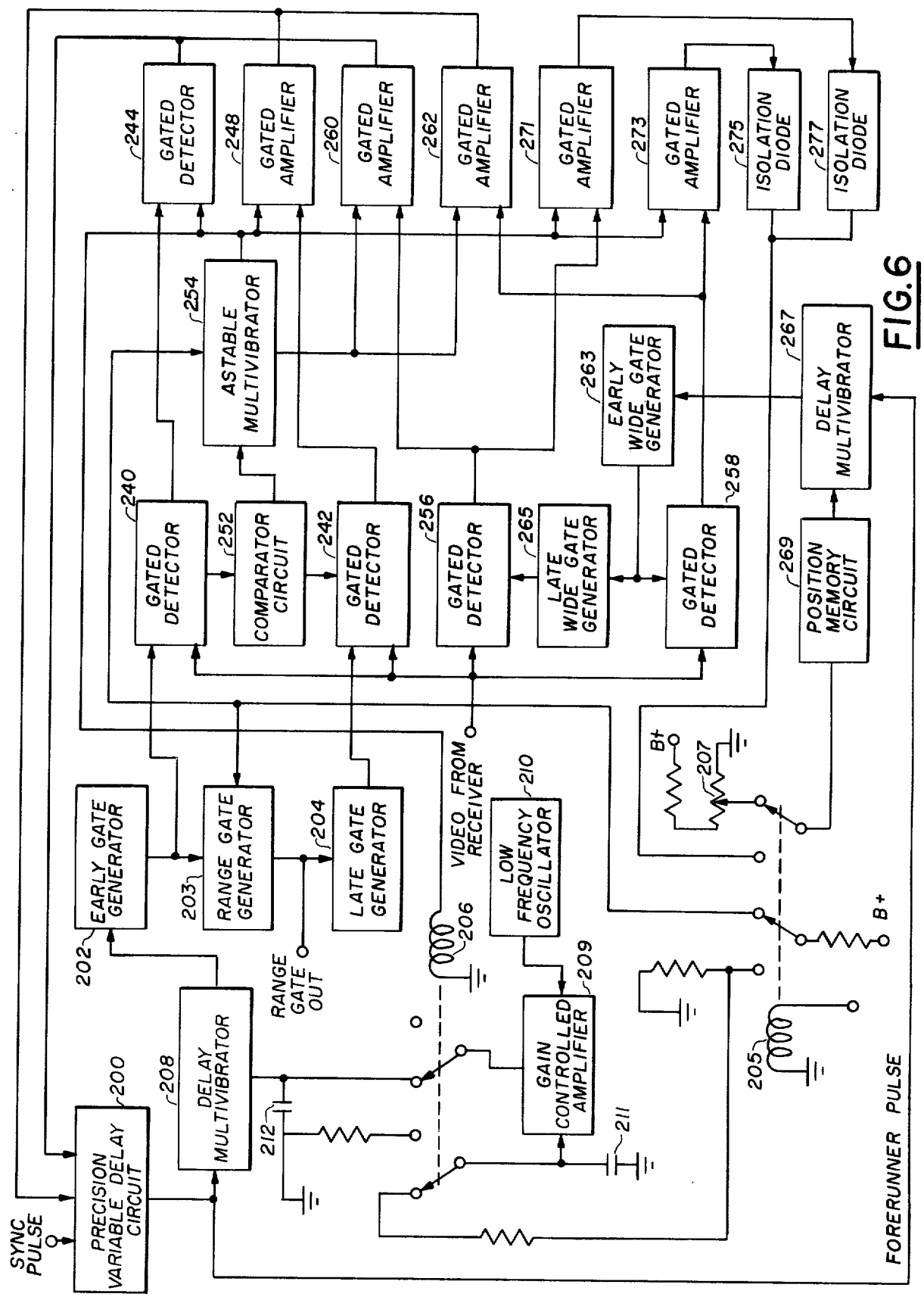
FIG. 6 is a block diagram of a circuit for selecting an aim point near to the center of the target along the range axis.

A circuit for selecting an aim point near the center of the target along the ranage axis is shown in FIG. 6. This circuit is a modification of the discriminator shown in FIG. 8 of the above referenced copending application. Precision variable delay circuit 200 may be a circuit that comprises circuit 14, 16, 18, 20, and 32 of the above referenced copending patent application or some other precision variable delay means. Consideration of the functioning of the circuit of FIG. 6 can begin with the seeker closing on a target at moderate range with relays 205 and 206 in the positions shown. B+ power is then supplied through relay 205 as a bias voltage for bistable multivibrator 254 so that it constantly remains in a condition to maintain gated amplifiers 260 and 262 in an on condition and amplifiers 244, 248, 271, and 273, in an Off condition. In this condition the circuit tracks the target by use of gating detectors 256 and 258 and a feedback to variable delay 200 via gated amplifiers 262, 260, and 262. This tracking action serves to continuously align the point where the wide gate generated wide gate generator 263 ends and the wide gate generator by gate generator 265 begins with the centroid of the target video signal along the range axis. However, while the foregoing tracking is in progress, position memory circuit 269 is tied to a fixed voltage from potentiometer 207 through relay 205. This is a fixed voltage which is present at the factory to make the delay of multivibrator 67 a prescribed value. Specifically, the total delay from the rise from the forerunner pulse to the point where wide gate 263 ends and gate 265 begins is made equal to the total delay between the rise of the same forerunner pulse and the rise of the range gate generated by range gate generator 203. Because of the setting of potentiometer 207 and the nature of the tracking action at this time, the range gate supplied by range gate generator 203 is kept aligned with the centroid of the target along the range axis even though the outputs of gates 202, 203, and 204 are not involved in the tracking action. In the event that there may be no element of the compound signal present at the particular point in range that constitutes the centroid of the target, gate 203 is made sufficiently wide (approximately one-half microsecond) to assure coincidence with some portion of the actual target signal so that directional information may be derived. The width of the range gate of range gate generator 203 is determined by the bias voltage applied through relay 205.

In the equalizing of the two delays following the forerunner pulse, the major portion of the delay between the forerunner pulse and the range gate (a delay of about 1 ½ microseconds) is introduced by delay multivibrator 208. Multivibrator 208 is similar to multivibrator 267, but has its length of delay controlled by the voltage from gain-controlled amplifier 209. The signal amplified by amplifier 209 comes from low frequency oscillator 210 and is typically sinsoidal in form. Any portion of the sinusoidal signal reaching multivibrator 208 after being amplified in amplifier 209 will cause the delay of multivibrator 208 to vary at a frequency determined by the frequency of oscillator 210 and this in turn causes the range gate from range gate generator 203 to oscillate or "hunt" slowly back and forth along the range axis by a small amount (through a range interval equivalent to ±one half microsecond or less) depending upon the gain of amplifier 209. The gain of amplifier 209 is controlled by voltage developed across capacitor 211. Prior to the activation of relay 205 the voltage across capacitor 211 is grounded through relay 206 and the gain of gain control amplifier 209 is zero. The range gate of range gate generator 203 does not hunt but remains fixed at the target centroid position as discussed above.

When the missile has closed range to a range where the target aim point refinement circuit action is to begin (range of about 4,000 feet) an activation signal at terminal 201 which may be supplied from the seeker range circuit closes relay 205. This removes the bias voltage from astable multivibrator 254 and connects memory circuit 269 input to diodes 275 and 277, thereby allowing the seeker portion of the circuitry to function as described in the above reference copending application. The bias removal simultaneously causes generator 203 to convert from the relatively wide range gate output that was discussed above to a narrow range gate that is approximately one range gate resolution element (10 nanoseconds) in width. The closure of relay 205 connects the B+ power supply voltage to capacitor 211 which causes the voltage across capacitor 211 to begin rising slowly. This in turn causes the signal from oscillator 210 to be applied with gradually increasing amplitude to the delay control terminal of delay multivibrator 208. The now narrow range gate from range gate 203 and the two tracking gates from early gate generator 202 and late gate generator 204 that straddle it first appears centered on a point that coincides with the centroid on the target along the range axis and then slowly hunt in range about this point with increasing amplitude. The above hunting action continues until the early and late gates come into a position where they are straddling an above-threshold portion of the target signal as determined by detectors 240 and 242 and comparator 252. This causes multivibrator 254 to switch states and results in a reconstituting of the tracking loops through the various gated amplifier connections. The circuit then commenses to track that particular portion of the target signal rather than an overall signal, and the gate out of range gate 203 is timed properly to gate that portion alone into the seeker directional informational circuitry. To stop the hunting action at this point, the switched output of multivibrator 254 also causes relay 206 to close. The delay control voltage from delay multivibrator 208 of that instant is then stored on capacitor 212, with amplifier 209 being disconnected. This voltage may subsequently leak off slowly, but the changes in the output of delay multivibrator 208 that result will be automatically compensated for by adjustments in delay circuit 200 through the tracking action.

The above described action leads to acquisition of a reflecting point near the center of the target along the range axis. At the short range where the target aim point refinement circuit functions, return signals will be strong and loss of the signal once acquired is unlikely. However, if loss should occur, reswitching of multivibrator 254 will result, and opening of relay 206, recommensing of the hunt cycle, and acquisition of another near-center portion of the compound target signal will result.

Obviously many modifications and variations of the present invention are possible in the light of the above teachings. In particular, pitch channel aimpoint refinement circuits may be added that function in a manner similar to the yaw circuits described above. It is therefore to be understood that within the scope of the appended claims the invention may be practiced otherwise than as specifically described.

What is claimed is:

1. In a terminal aim point refinement circuit for use in a missile guidance system, the combination comprising:
   a. first input means for receiving sum video signals from the sum video channel of the missile guidance system,
   b. second input means for receiving difference video signals from the difference video channel of the missile guidance system,
   c. gate circuit means coupled to said sum video signal input means for generating an output voltage proportional to the continuous duration of a particular portion of the sum video signal reflected from a target of interest,
   d. a peak detector circuit coupled to said gate circuit means for detecting and storing the highest output voltage from said gate circuit means,
   e. comparator circuit means coupled to said peak detector circuit and to said gate circuit means for generating an output pulse each time the output voltage from said gate circuit means is greater than the peak voltage stored in said peak detector circuit,
   f. integrator circuit means coupled to said second input means and to said gate circuit means for integrating the difference video signals reflected from the target of interest that correspond to those sum video signals having sufficient amplitude to generate an output voltage,
   g. a memory circuit for providing an output yaw error signal,
   h. clamping circuit means, coupled to said memory circuit, said integrator circuit means, and said comparator circuit means for clamping said memory circuit with the output of said integrator in response to the output pulse from said comparator circuit means,
   i. range output circuit means coupled to said peak detector circuit means and to said comparator circuit means for generating an output range correction voltage.

2. The refinement circuit of claim 1 wherein said gate circuit means includes:
   a. a first gate generator for generating gate signals of a predetermined width in response to an initiating pulse,
   b. a first gating circuit coupled to said sum video signal input means and to said first gate generator for gating the sum video signals in response to the gate signals from said first gate generator,
   c. threshold circuit means coupled to said first gating circuit for passing sum signals above a predetermined value,
   d. an overdriven amplifier circuit coupled to said threshold circuit for providing output signals at full amplitude for the duration of each signal passed by said threshold circuit and zero output when no signals are passed by said threshold circuit, e. a second gate generator coupled to said overdriven amplifier for generating a gate signal each time the output signal from said overdriven amplifier goes from full amplitude to zero, f. a second gating circuit means coupled to said overdriven amplifier and to a dc voltage source, for gating the dc voltage in response to the output signal from said overdriven amplifier, g. integrating circuit means coupled to said second gating circuit means and to said second gate generator for providing an output voltage whose peak amplitude is proportional to the length of time there is an input signal from said overdriven amplifier.

3. In a terminal aim point refinement circuit which selects a reflecting portion of the target nearest to the mean yaw displacement axis for use in a missile guidance system, the combination comprising:

a. first input means for receiving sum video signals from the sum video channel of the missile guidance system, b. second input means for receiving difference video signals from the difference video channel of the missile guidance system, c. first gate circuit means coupled to said first and second input means for gating significant portions of the sum and difference video signals, d. a summing network circuit means having first and second inputs and an output, e. first integrator circuit means coupled to said first gate circuit means for integrating and coupling the gated difference video signals to one of the inputs of said summing network circuit means, f. second gate circuit means coupled to a source of carrier signals and to said first input means for generating a series of bursts of carrier signals timed to correspond with the gated sum video signals, g. second integrator circuit means coupled to said second gate circuit means for integrating the bursts of carrier signals to form a sawtooth signal and having its output coupled to the other input of said summing network circuit means, h. differential amplifier circuit means having a first input coupled to said first gate circuit means and a second input coupled to the output of said summing network circuit means and having an output that goes to zero when the two inputs become equal indicating that the signal present at that instant comes from a reflecting object that lies in the mean angular direction of all returns within the reception period, i. null detector circuit means coupled to the output of said differential amplifier, j. yaw signal gate circuit means coupled to said null detector circuit means and to said first gate circuit means for gating in response to a detected null the particular difference video signal segment that produced the null as the yaw output signal.

4. In a terminal aim point refinement circuit for use in a missile guidance system wherein a single composite video signal from the seeker contains the monopulse sum signal and a yaw signal for each range element separated in time by a predetermined amount, the combination comprising:

a. gate circuit means adapted to receive the composite signal from the seeker and gating said composite signal with precisely spaced gates periodically, b. pulse stretching circuit means coupled to said gate circuit means for stretching each of the gated elements, c. signal processing circuit means coupled to said pulse stretching circuit means for providing an output signal which is a ratio of the yaw signal amplitude to the corresponding sum signal amplitude representing the angular position of the source of that particular gated signal segment with respect to the seeker antenna axis, d. and frequency sweep generator means coupled to said signal processing circuit means for sweeping the yaw and sum signals jointly in range thereby allowing this sequence to be repeated for consecutive signal elements with successive periodic gating.

5. The aim point refinement circuit of claim 4 wherein said gate circuit means comprises:

a. a bistable multivibrator having a first input connected to a terminal adapted to receive and being triggered by an intiating pulse, a second input, a first output and a second output, b. a delay circuit means coupled between said initiating pulse and the second input of said bistable multivibrator to trigger said bistable multivibrator after a predetermined time delay, c. a delay multivibrator having a first input coupled to said first and second outputs of said bistable multivibrator, a second input and an output, d. a low frequency sweep generator having an output coupled to the second input of said delay multivibrator causing the delay to vary during the course of its operation, e. a gate generator having an input coupled to the output of said delay multivibrator for generating gates of a predetermined duration in response to an output from said delay multivibrator, f. first and second gating circuits, each having a first input coupled to the output of said gate generator, said first gating circuit having a second input coupled to one of the outputs of said bistable multivibrator and being responsive to the first output pulse for gating the first pulse generated by said gate generator, said second gating circuit having a second input coupled to the other output of said bistable multivibrator and being responsive to the second output pulse for gating the second pulse generated by said gate generator, g. third and fourth gating circuits, each having a first input coupled to a terminal adapted to receive the sum and yaw composite video signal, said third gating circuit having a second input coupled to and being responsive to the output signal from said first gating circuit to gate the sum portion of said composite video signal, said fourth gating circuit having a second input coupled to and being responsive to the output signal from said second gating circuit to gate the yaw portion of said composite video signal.

6. The aim point refinement circuit of claim 5 wherein said pulse stretching means includes:

a. a first boxcar detector coupled in circuit with a threshold circuit to the output of said third gating circuit for providing a stretched sum signal, b. an overdriven amplifier having an input coupled to the output of said first boxcar detector and providing an output signal of constant amplitude in response to the stretched output signal, c. a triggered integrator having a first input coupled to the output of said first boxcar detector and having a second input coupled to the output of said second gating circuit for providing a sawtooth voltage output whose amplitudes are proportional to the amplitude of said first boxcar detector, d. a fifth gating circuit having a first input coupled to the output of said fourth gating circuit and having a second input coupled to and being responsive to the output of said overdriven amplifier for gating the output of said fourth gating circuit to provide a segment of yaw signal which directly corresponds to the gated sum signal from said third gating circuit, e. a second boxcar detector having a first input coupled to said fifth gating circuit, a second input and an output, f. a multiar circuit coupled between the output of said triggered integrator and the second input of said second boxcar whereby said boxcar detector provides an output signal having a duration inversely proportional to the amplitude of the sum signal.

7. The aim point refinement circuit of claim 6 wherein said signal processing circuit means includes an integrator having a first input coupled to the output of said second boxcar detector and a second input coupled to the output of said triggered integrator for providing an output proportional to the yaw signal amplitude divided by the corresponding sum signal amplitude.

8. In a terminal aim point refinement circuit for use in selecting an aim point near the center of the target along the range axis of a missile guidance system, the combination comprising:

a. a range gate generator;

b. bias circuit means adapted to be coupled to said range gate generator and providing a bias voltage to said range gate generator when said missile is greater than a predetermined range from the target, c. variable delay circuit means coupled to said range gate generator and to said bias circuit means for causing the width of the output gate from said gate generator to vary, d. first relay circuit means coupled to said bias circuit means for removing the bias voltage and second delay means coupled to said variable delay means for removing the variable delay from said gate generator when the missile is closer to the target than said predetermined range.

* * * * *